INVENTOR.
MICHAEL T. GAVRUN
BY Raymond P. Wallace
AGENT

April 28, 1970 M. T. GAVRUN 3,508,404
SUPPORT MEMBER FOR RESTARTABLE ROCKET ENGINES
Filed June 24, 1968 6 Sheets-Sheet 3

INVENTOR.
MICHAEL T. GAVRUN
BY Raymond P. Wallace
AGENT

April 28, 1970 M. T. GAVRUN 3,508,404
SUPPORT MEMBER FOR RESTARTABLE ROCKET ENGINES
Filed June 24, 1968 6 Sheets-Sheet 4

INVENTOR.
MICHAEL T. GAVRUN
BY Raymond P. Wallace
AGENT

FIRING

COOLDOWN

INVENTOR.
MICHAEL T. GAVRUN
BY Raymond P. Wallace

AGENT

April 28, 1970 M. T. GAVRUN 3,508,404
SUPPORT MEMBER FOR RESTARTABLE ROCKET ENGINES
Filed June 24, 1968 6 Sheets-Sheet 6

INVENTOR.
MICHAEL T. GAVRUN
BY Raymond P. Wallace

AGENT

United States Patent Office 3,508,404
Patented Apr. 28, 1970

3,508,404
SUPPORT MEMBER FOR RESTARTABLE ROCKET ENGINES
Michael T. Gavrun, Bayonne, N.J., assignor to Curtiss-Wright Corporation, a corporation of Delaware
Continuation-in-part of application Ser. No. 437,072, Mar. 4, 1965. This application June 24, 1968, Ser. No. 739,315
Int. Cl. F02k 9/00; B64d 33/04
U.S. Cl. 60—271                                17 Claims

ABSTRACT OF THE DISCLOSURE

A rocket engine or nozzle formed of wedge-shaped segments, subject to circumferential expansion, and surrounded, supported, and maintained in gas-tight relationship by an annular, metallic, elastically contractile-expansible member.

CROSS REFERENCE TO RELATED APPLICATIONS

This application is a continuation-in-part of application Ser. No. 437,072, filed Mar. 4, 1965, now abandoned, which in turn is a continuation in part of application Ser. No. 367,768, filed May 15, 1964, now abandoned.

BACKGROUND OF THE INVENTION

This invention relates to rocket engines and rocket nozzles, and more particularly to such devices having repeated firing cycles.

The rocket engine of the present invention is particularly useful as an auxiliary engine such as, for example, an attitude control engine or an ullage engine to be used in combination with relatively large prime movers in a rocket vehicle or the like. Engines of this type are designed for relatively short firing periods and must be capable of restarting many times. It should be understood, however, that the rocket engine or nozzle of the present invention also have applications as power sources to be used for propulsion or other power requirements.

Repeated restarting of rocket engines after initial firing sequences has been a difficult problem due to the fact that the high temperatures produced, which may be in excess of 6000° F. in such engines, lead to an erosion of the inner surface thereof, particularly in the upstream portions of said engines including the throat region of the exhaust nozzle, which erosion leads to a decrease in the effective thrust output of the rocket engine. Various attempts have been made at cooling the inner surface in order to prevent the erosion thereof. One such system has been known as ablative cooling. In the ablative cooled system the results have not been entirely satisfactory due to the fact that during the off-time or the period shortly after firing of the rocket engine, the ablative portions of the engine tend to boil away as a result of the retention of heat in this region. Another system known as radiation cooling has also been tried but in this system the engine is required to be exterior of the supporting vehicle thus requiring the fuel lines and related mechanisms to be provided with separate heating means in order for these elements to remain operative, particularly in the region of outer space. A third system known as regenerative cooling has also been used in which the fuel used to fire the engine is used as a coolant for reducing the temperature of the nozzle portion. However, it has been found that in this system the liquid fuel during cool-down periods will coke in the lines thus making this system also unsatisfactory. It will be apparent therefore, that these prior systems are not entirely satisfactory in situations where it is desired to periodically restart the engines as for example, in the case of attitude control wherein the engine must be periodically fired for course corrections.

SUMMARY

As will be apparent from the description hereinafter, the engine of the present invention is capable of numerous restarts due to the novel construction provided for by said invention. The invention generally comprises a rocket engine including a combustion chamber and an exhaust nozzle having an inner or first layer, which is coaxial with the rocket engine axis and defines the inner surface of said combustion chamber and said exhaust nozzle. The first layer is composed of a material which is relatively highly thermally conductive, at least in a direction parallel to the rocket engine axis and also preferably in a radial direction relatively to the engine axis. The unique properties of the material used, as will be explained in greater detail below, provides a heat conduction path during cool-down periods of the engine which permits heat to radiate from the engine before temperatures can reach a point which will cause erosion of the inner surface or gas wall. The first layer further comprises a plurality of elements stacked in side-by-side circumferential relationship to form an annulus and is supported by an annular load carrying member. The annular load carrying member preferably is metallic and is constructed so as to be elastically expansible primarily in the circumferential direction to permit thermal expansion of the stacked elements during firing of the rocket engine so as to avoid excessive stresses in said elements. Heat conduction, particularly during cool-down periods between firing of the rocket engine, primarily takes place towards the discharge end of the nozzle portion where the heat radiates from said nozzle discharge portion into the relatively cool surrounding outer environment. Hence, it will be apparent that the rocket engine has the characteristic of conducting heat away from the inner surface of the engine for preventing erosion thereof so that the profile of the inner surface is maintained and the engine may be restarted many times.

Accordingly, it is one object of the invention to provide a novel and improved rocket engine structure.

It is another object of the invention to provide a means of retaining an annular device formed of discrete wedges in gas-tight relationship.

It is a further object to provide means allowing expansion and contractions of refractory material without damage.

A still further object is to provide an annular metallic support member resiliently responsive to thermal expansion and contraction of the supported structure.

DESCRIPTION OF THE PREFERRED EMBODIMENTS

Figure 1:
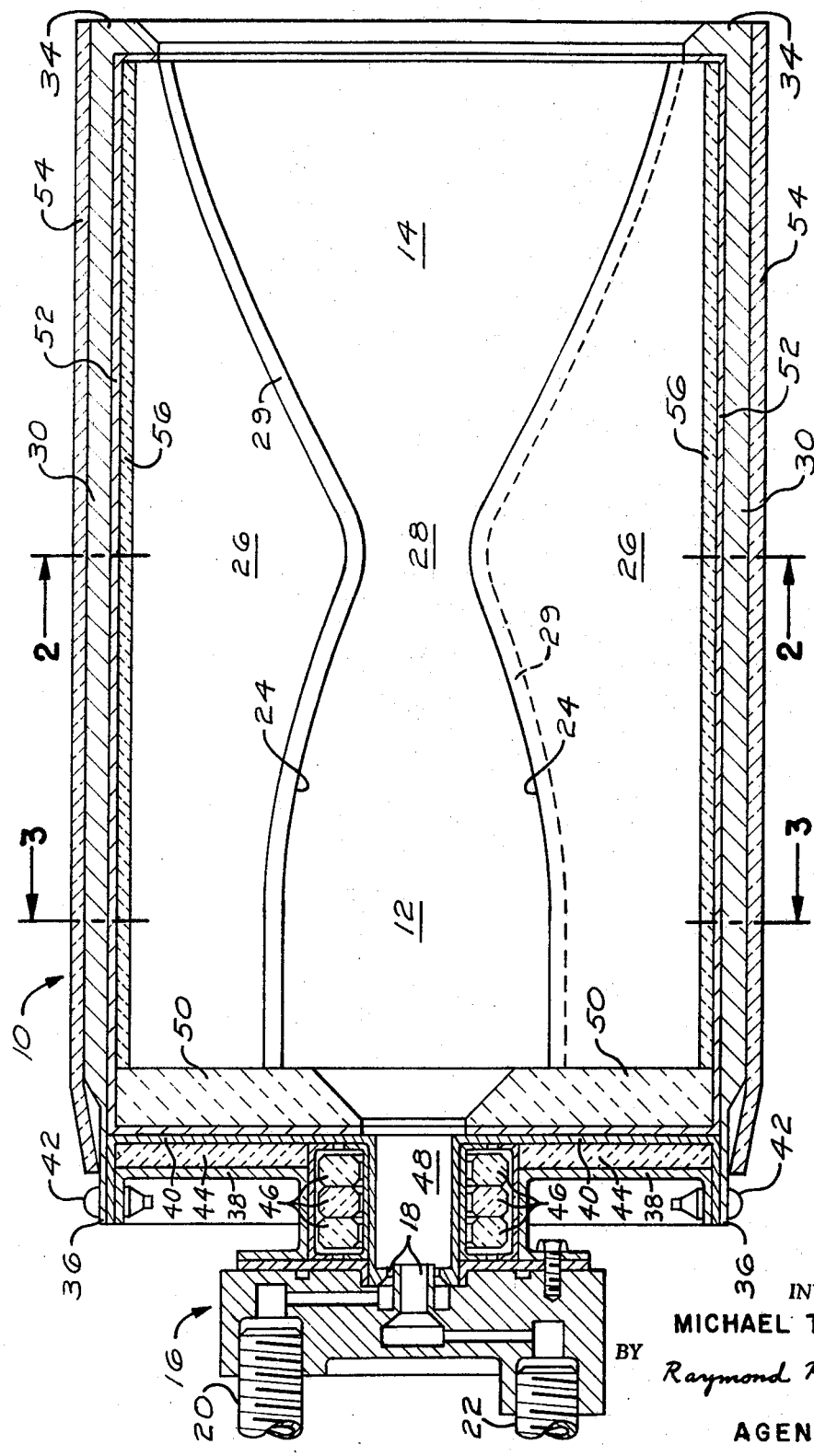
FIG. 1 is an axial sectional view of a complete rocket engine embodying the present invention.
Figure 7:
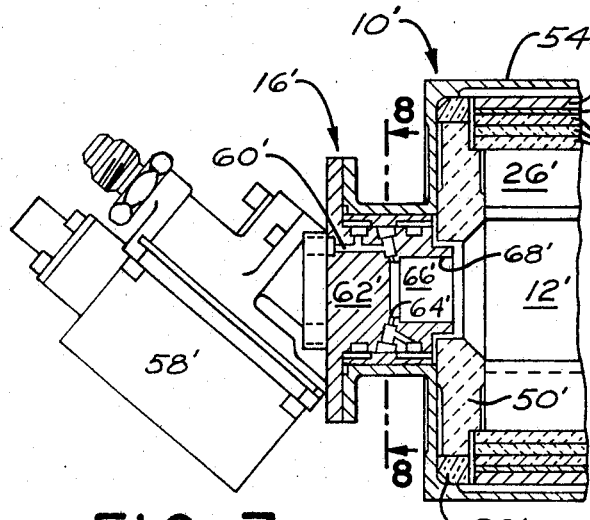
FIG. 7 is a partial sectional view showing a preferred type of injector mechanism.
Figure 8:
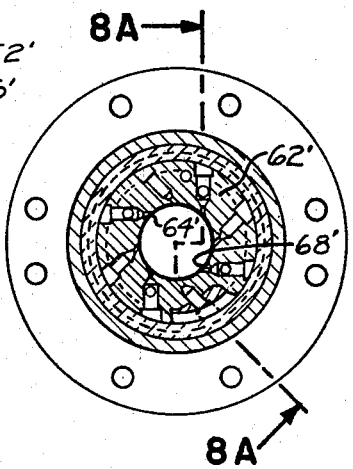
FIG. 8 is a sectional view of the injector mechanism of FIG. 7 taken along line 8—8 of FIG. 7.
Figure 8A:
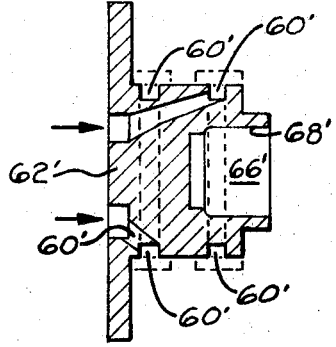
FIG. 8A is a sectional view taken along line 8A—8A of FIG. 8.

Referring to FIG. 1, there is shown therein a rocket engine 10 including a combustion chamber 12 and a convergent-divergent exhaust nozzle portion 14. An injector support housing 16 is provided at the forward end of the rocket engine 10 and includes an injector structure, generally designated at 18, which may be supplied with hypergolic fuels through supply lines 20 and 22. It should be understood however, that the invention is not limited to the fuel supply or injector system illustrated in FIG. 1 and that any suitable type fuel and supply system therefor may be used with the invention. Preferably, however, an injector mechanism as illustrated in FIGS. 7, 8 and 8A is used which will be described in greater detail below. The rocket engine 10 has an inner surface 24 generally formed by a first layer with, as stated above, the exhaust nozzle portion 14 thereof having a convergent-divergent profile.

The first or inner annular layer of the annular casing for the rocket engine 10 is formed from a plurality of abutting wedge-shaped pieces 26 of pyrolytic graphite stacked circumferentially in side-by-side relation to form an annulus in a manner which will be more clearly explained below. As will also be explained in greater detail below, pyrolytic graphite possesses unique properties which properties are applied in the invention to provide heat conduction away from the inner surface 14 of the rocket engine 10 and particularly away from the nozzle throat.

Pyrolytic graphite is normally deposited on a substrate layer which substrate layer usually is a conventional graphite. As the pyrolytic graphite is deposited it forms a layer having marked anisotropic properties. In any direction parallel to the plane of the deposited layer, pyrolytic graphite is highly thermally conductive and has a relatively low coefficient of thermal expansion, while in a direction perpendicular to the plane of deposit, the material is highly non-conductive but with a relatively high coefficient of thermal expansion in this direction. Pyrolytic graphite significantly has high heat conduction properties even at the extremely high temperatures that graphite can withstand. In addition the heat insulating property of pyrolytic graphite increases with increase in temperature. As stated above, the present invention makes use of these properties to provide a heat sink construction with sufficient capacity to substantially eliminate erosion of the inner surface or gas wall of the rocket engine and in particular in the regions where the temperatures are relatively extreme, such as, for example, the nozzle throat 28.

As previously mentioned, the wedges 26 of the first layer are preferably formed from pyrolytic graphite which material has definite anisotropic properties. The pyrolytic graphite is obtained in a furnace by vapor deposition from carbon bearing vapor. The pyrolytic graphite wedges 26 are formed by depositing carbon on a flat surface, the carbon being deposited on said surface to form a layer of pyrolytic graphite of sufficient thickness so that wedges of desired thickness to be used in said rocket engine can be cut and machined from said layer. It is known that the thickness to which pyrolytic graphite can be deposited is limited and therefore the wedge thickness is likewise limited. However, if it is found that the pyrolytic graphite can be deposited in greater thickness then of course, thicker wedges and therefore a lesser number may be used. The wedge structure itself is formed by cutting and machining such a deposited layer of pyrolytic graphite such that a median plane between the sides of the wedge is substantially parallel to the plane of deposit on the pyrolytic graphite. The inner surface 24 of the rocket engine to which the first layer generally conforms is then built up from a plurality of such wedges 26 disposed in a circle to form a substantially annular ring-shaped layer about the axis of said rocket engine. The wedges 26 of the invention have their layer or deposited plane disposed so that said plane substantially includes the rocket engine axis about which said wedges 26 are circumferentially arranged to form an annular shape or layer coaxial with said axis.

As can be seen in FIG. 1, the wedges 26 each extend substantially the entire length of the rocket engine 10 from the upstream end of the rocket combustion chamber 12 to the downstream end of the nozzle 14 and have a profile which defines the inner surface of the combustion chamber 12 and the inner surface of the exhaust nozzle 14 including the throat portion 28. It will be seen therefore, that each wedge member 26 is made up of layer planes of pyrolytic graphite which extend along the length of said wedge and the rocket engine 10 is constructed so that each layer plane lies in a plane passing through the axis of said rocket engine 10.

In directions parallel to the plane of deposit of the pyrolytic graphite, the pyrolytic graphite has excellent heat conduction properties while in a direction perpendicular to the plane of deposit pyrolytic graphite is an excellent heat insulator. Thus, with reference to FIGS. 1–3, 5, 7, 9, 11 and 11A, it will be seen that, in directions longitudinally and radially relative to the axis of the rocket engine, as well as in any direction parallel ot the surfaces or median plane of each of the wedges 26, there will be good heat conduction while in a direction substantially perpendicular to the median plane of each of the wedges 26, there will be little, if any, heat conduction. From the illustrations of FIGS. 2 and 3, it will be apparent that when a plurality of wedges 26 are disposed in a manner to form the rocket engine interior, the rocket engine will have high heat conduction in directions parallel to the engine axis and radially from said axis. However, in a circumferential direction with respect to said axis, that is in a direction from one wedge 26 to an adjacent wedge 26, the rocket engine will have high heat insulating properties with little heat being conducted around the rocket engine in a circumferential direction. It will be apparent therefore that heat from the rocket combustion gases which is transferred to the wall of the rocket combustion chamber 12 and nozzle 14 will be relatively rapidly conducted away radially outwardly from the inner surface 26 thereof and then in a generally axial direction. Thus, it will be seen that heat saturation of the inner surface of the rocket engine is delayed by allowing the heat to flow into portions of the engine which are relatively cool which thereby forms a very efficient heat sink and prevents the inner surface from reaching temperatures which may cause decomposition of the inner surface or gas wall 24 of the rocket engine 10. It should also be noted that the capacity of the heat sink construction of the invention may be further increased by increasing the radial depth of the first or inner layer. Reference may be made for a more complete and detailed description of the use of pyrolytic graphite and its properties to Patent No. 3,156,091, issued on Nov. 10, 1964 to George Kraus and Patent No. 3,224,193, issued on Dec. 21, 1965 to Joseph Loprete and Arthur Cangialosi.

Pyrolytic graphite is also characterized by the fact that it has a relatively high rate of thermal expansion in the direction of good heat insulation. Thus, in the present embodiments of the invention, as illustrated in the drawings, the rocket engine 10 will have a relatively high rate of thermal expansion in the circumferential direction relative to the axis of said rocket engine. However, pyrolytic graphite is also characterized in that it has a relatively low rate of thermal expansion in the direction of good heat conduction which in the present invention will be in the axial and radial directions relative to the axis of the rocket engine which therefore eliminates a problem present in prior rocket engines of thermal expansion in the axial direction. This eliminates the need for providing bulky expansion joints to compensate for the axial thermal expansion. However, it is also within the scope of the invention to provide means for compensating for any slight expansion in the axial and radial directions.

Figure 4:
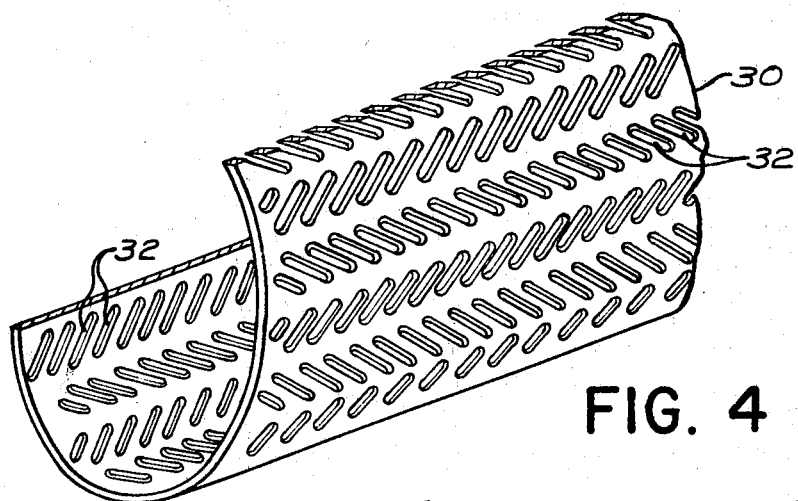
FIG. 4 is a partial perspective view of one of the layers of the rocket engine shown in FIG. 1.
Figure 10:
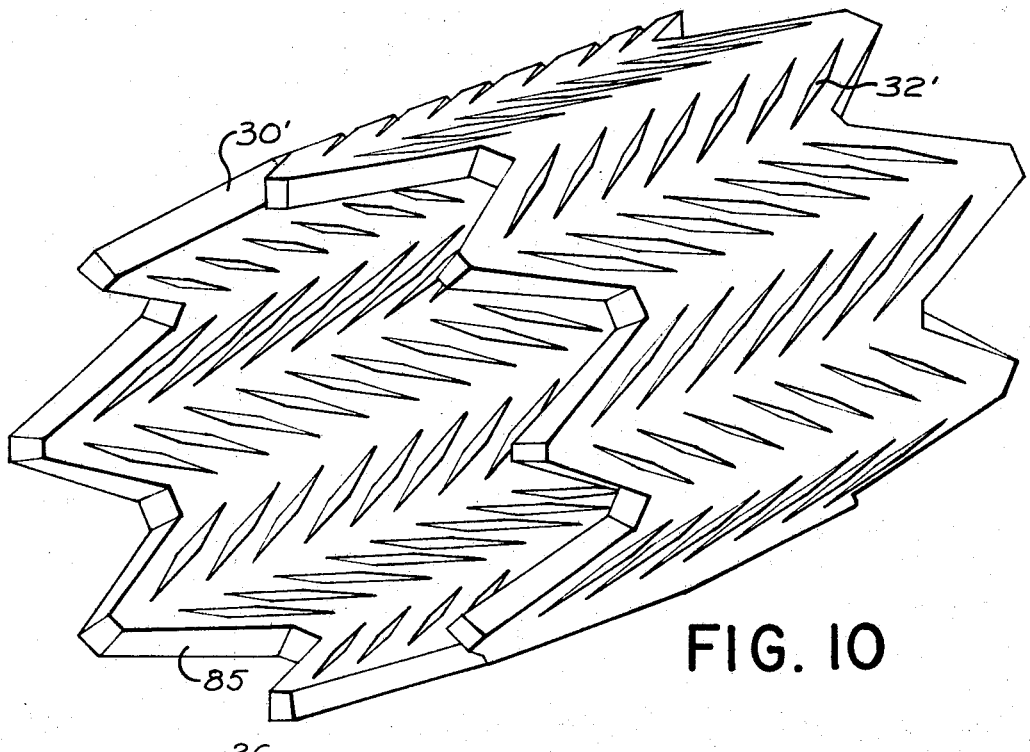
FIG. 10 is a perspective view of another embodiment of a layer of the type shown in FIG. 4.
Figure 12:
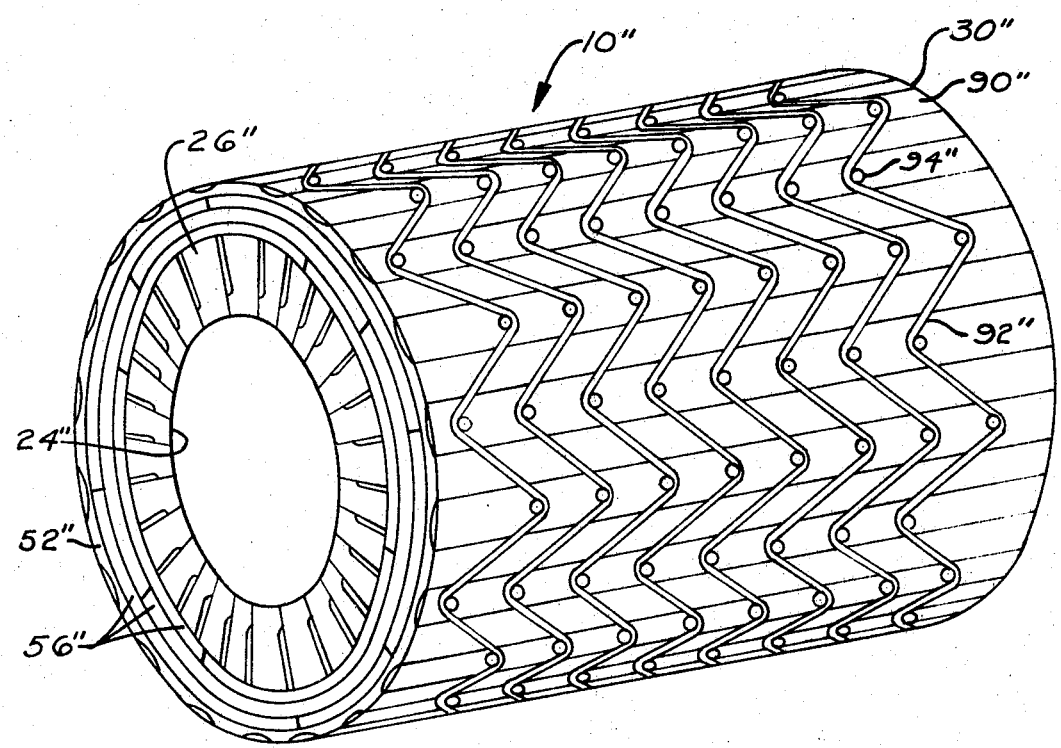
FIG. 12 is a perspective view of still another embodiment of a layer of the type shown in FIG. 4 shown as a part of a rocket engine.

In order to compensate for the thermal expansion in the circumferential direction of the pyrolytic graphite wedges 26 and for supporting the wedges against the internal pressure of the rocket engine, a cylindrically-shaped metallic member 30, FIG. 4, 30', FIG. 10, or 30'', FIG. 12 is provided in surrounding load carrying disposition relative to the first or inner layer of wedges 26.

The metallic member 30 is preferably composed of a high temperature metal such as a tungsten alloy material or a titanium alloy material and is provided with a plurality of cutout portions 32. The cutout portions 32 are disposed at an inclined angle relative to the axis of said member 30 forming a series of herringbone-like beams, and as a result, the material of the member 30 is discontinuous in the circumferential direction so that when said member 30 is under stress, the cutout portions 32 permit the metallic member 30 to resiliently expand more readily to internal pressure. Thus, it may be said that the member 30 has spring-like characteristics. Therefore, when the member 30 is under the stresses resulting from expansion in the circumferential direction of the layer consisting of the pyrolytic wedges 26, the metallic member 30 will yield more readily to allow expansion between adjacent wedge members 26. The expansion permitted by the member 30 in the circumferential direction is limited or restrained so that the member 30 also serves to maintain alignment of the wedge members 26 relative to one another so that the profile of the inner surface 24 and the annular shape of the rocket engine is maintained. Preferably the member 30 preloads the wedge structure in compression and permits restrained expansion during operation.

As viewed in FIG. 1, it will be seen that the member 30 can have a turned-in flange portion 34 which partially encloses the wedge members 26 at the discharge end of the exhaust nozzle portion 14. This portion 34 at the discharge end of the nozzle portion 14 serves to hold the wedge members 26 against the axially rearward force exerted by the rocket combustion gases against the members 26 thereby maintaining axial alignment of the wedge members 26 and at the same time permitting a limited amount of axial expansion, which is stated above is very low since the wedge members are relatively highly thermally conductive in the axial direction with relatively low expansion in this direction. The axial expansion of the rocket engine 10 has been found to be in the neighborhood of 0.004 inch per inch of length. Thus, it will be seen that the member 30 serves to provide limited or restrained expansion of the wedge construction primarily circumferentially and, in a limited sense, axially while maintaining alignment of the stacked wedge elements 26 and as a result the hoop stresses produced in the rocket engine will be taken up by the resilient member 30 for preventing destruction of the wedge construction of the rocket engine. It should be understood that, if it is found necessary, the arrangement of the cutouts 32 can be varied so as to make the material of the member 30 discontinuous both circumferentially and axially for permitting greater expansion in both directions.

Referring again to FIG. 1, the member 30 extends axially upstream of the wedge construction and has a portion 36 thereof which is bolted to support plates 38 and 40 of the injector housing 16 by suitable bolts 42. Disposed between the support plates 38 and 40 of the injector housing 16 is a suitable insulation material 44 which serves to prevent the outer surface of the injector housing 16 from getting too hot. The injector housing 16 also is provided with a plurality of annular rings or wafers of pyrolytic graphite designated at 46 which wafers 46 surround a chamber 48 wherein the fuel and oxidizer mix for combustion in the combustion chamber 12 of the rocket engine. The wafers 46 of pyrolytic graphite are oriented so that they are relatively highly thermally conductive in the radial and circumferential directions relative to the rocket engine axis and highly non-conductive in an axial direction relative to said rocket engine axis. Through this construction heat passage in an axial direction from the upstream end of the combustion chamber 12 is limited due to the insulating properties of the wafers 46 and any heat present in the region of the wafers 46 will be conducted radially away from the inner surface of the mixing chamber 48 so that this area of the injector mechanism 18 will be kept relatively cool. Thus, damage to the injector mechanism 18 is prevented due to over-heating. However, as stated above, the invention is not limited to the type injector mechanism 18 illustrated in FIG. 1 and the details thereof form no part of the present invention.

Disposed at the upstream end of the first or inner layer 26, that is at the upstream end of the combustion chamber 12, is an annular member or ring of pyrolytic graphite 50. The annular member 50 has its plane of deposit oriented in a direction perpendicular to the rocket engine axis so that in the direction parallel to the rocket engine axis the annular member 50 is relatively highly thermally non-conductive. Thus, it will be apparent that heat conduction from the first layer or the wedges 26 in an upstream direction is substantially prevented due to the insulating properties of the annular member 50. Therefore, heat will be substantially prevented from flowing in the axial upstream direction from the upstream end of the first layer since the annular member 50 provides an insulating barrier limiting any heat conduction therethrough.

With reference to FIG. 1, for example, it can be seen that the entire first layer of pyrolytic graphite including the combustion chamber 12, the throat portion 28 and the nozzle portion 14 will form one large heat sink area for conducting heat away from the inner surface 24, in particular the throat portion 28. In the rocket engine 10 of the invention there are no joints necessary between the combustion chamber and nozzle portions, as is the case in most rocket engines wherein the nozzle portion is generally a separate construction. As is known, when joints are required between the various portions of the engine, there may be problems of heat transfer across the joints as well as gas leakage in this area. In the present invention, no such joints are required and the whole engine forms an effective heat sink which minimizes erosion of the inner surface and permits the engine to be restarted many times.

Figure 5:
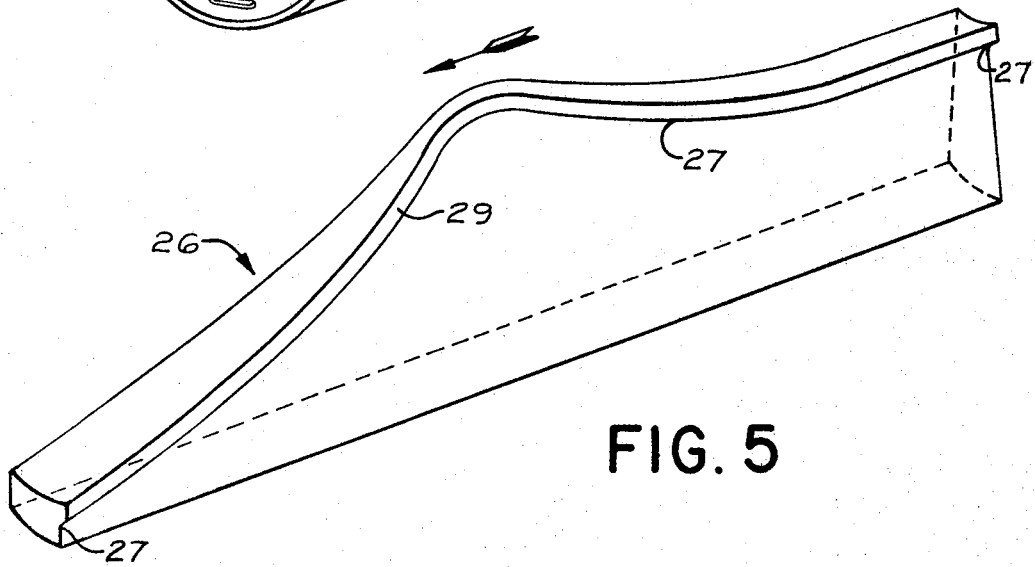
FIG. 5 is a perspective view of one of the elements making up the inner surface of the rocket engine shown in FIGS. 1–3.
Figure 11:
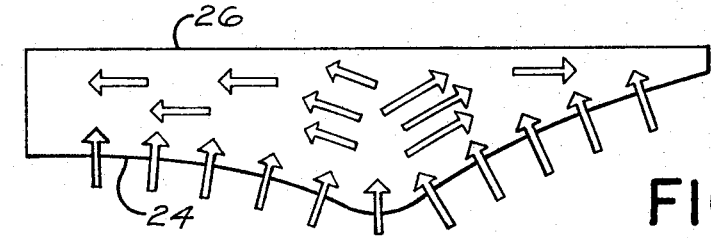
FIGS. 11 and 11A are diagrammatic views of the heat flow in the wedges of the invention during the firing and cool-down phases, respectively.
Figure 11A:
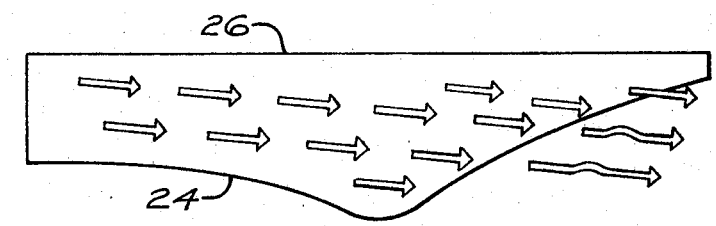

Referring to FIGS. 11 and 11A, in FIG. 11 the arrows illustrate the direction of heat flow away from the inner surface 24 during firing. FIG. 11A shows the path of heat conduction during cool-down or the period subsequent to firing. As can be seen in FIG. 11A, the heat stored in the wedge structure will flow toward the nozzle exit portion during cool-down at which time the heat will radiate out into the relatively cooler surrounding atmosphere from the surface of the nozzle exit portion. Because of the excellent heat conductive properties of pyrolytic graphite and the orientation thereof for conduction in the axial direction, the engine will effectively cool itself down by radiation of the heat from the nozzle exit portion during cool-down periods. For this purpose, the first layer of the nozzle exit portion of the embodiment of FIG. 1 has a relatively smaller radial thickness towards the discharge end so as to increase the radiation capabilities by exposing a greater surface area at the nozzle exit portion to the relatively cooler outer atmosphere. (FIGS. 1 and 5.)

Figure 2:
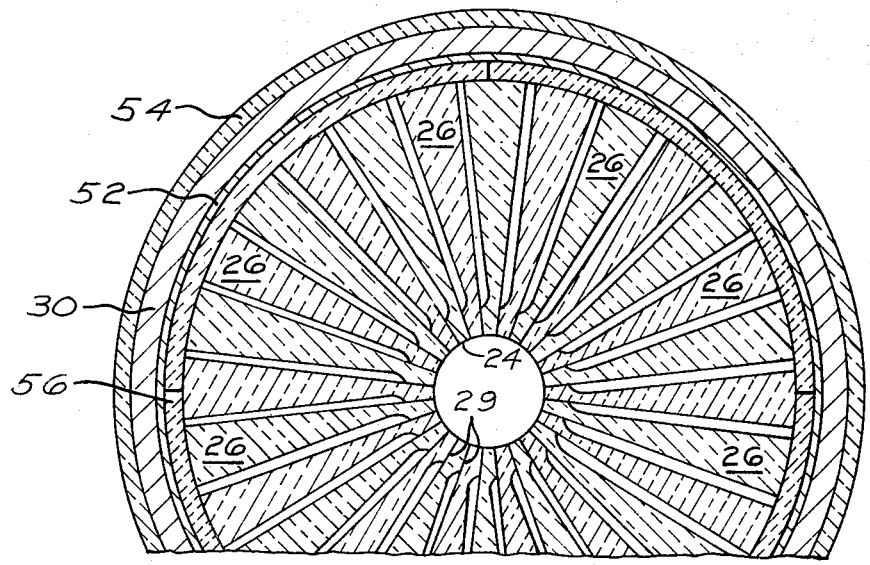
FIG. 2 is a sectional view taken along line 2—2 of FIG. 1.
Figure 3:
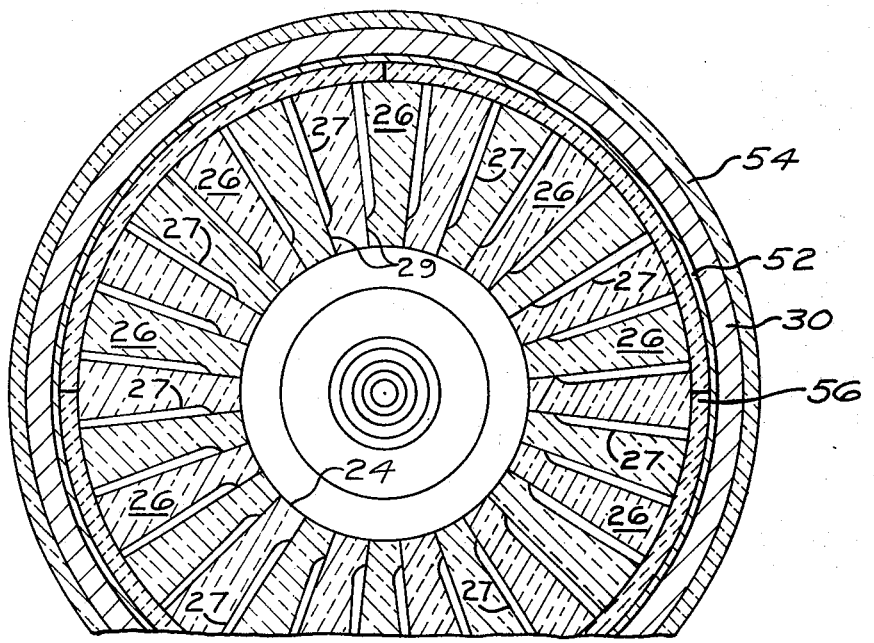
FIG. 3 is a sectional view taken along line 3—3 of FIG. 1.

As illustrated in FIGS. 1–3 and 5, each of the wedges 26 is further provided with a cutback portion or undercut 27 along a substantial portion of one of its faces with a portion thereof not being undercut to leave a land 29 at the radially inner portion thereof, as viewed in the assembly shown in FIGS. 1–3. The undercut portions 27 allow for limited area contact of the lands 29 between the wedges 26 due to thermal expansion in the circumferential direction and since the lands 29 are disposed at the radially inner edges of the wedge members 26, said lands 29 insure that the wedges 26 will abut against one another in the region of the gas wall or inner surface of the wedge layer 26 for preventing gas leakage between adjacent wedges 26. The undercuts 27 make the area of contact of the restrained material more uniform and minimizes the load carried by the member 30. This also minimizes the non-uniformity of the restraining loads over the length of the member 30 so that said member may be made of substantially uniform thickness. Due to the construction of the wedges 26 and the provision of the elastically yieldable, spring-like member 30, the rocket engine 10 is subject to substantially no deformation due to thermal expansion during operation.

Again referring to FIGS. 1–3, it will be seen that a relatively thin layer or coating 52 is provided between the wedges 26 and the elastically yieldable metallic load carrying member 30 and between the annular member 50 of pyrolytic graphite and the metallic support plate 40 of the injector housing. The layer 52 which may be termed a diffusion barrier has the characteristics of preventing the flow or diffusion of gases, such as oxygen, hydrogen and nitrogen, and the passage of carbon therethrough and into contact with the metallic support member 30 for preventing oxidation, embrittlement and carburization of the metallic member 30 and metallic support plate 40. Thus, the diffusion barrier 52 serves as a protective layer which prevents contamination of the metallic members 30 and 40 from the gases or carbon so that these members will not fail during operation of the rocket engine 10. This feature is particularly significant insofar as the metallic member 30 is concerned since said member 30 must retain its characteristics for supporting the wedge members 26 and for permitting restrained expansion between the wedge members 26 so that for example, the circumferential or hoop stresses during firing of the rocket engine will not build up in the wedge members 26 to cause failures of said wedge members 26. The material of the diffusion barrier 52 must be such that it does not become embrittled or otherwise subject to failure during rocket operation. The layer 52 may be comprised of an aluminum tin composition or compositions of vanadium, columbium carbide and zirconium oxide, although other suitable materials may be used, such as tantalum, which have the above explained characteristics of preventing flow or diffusion of engine gases into contact with the annular expansible support member 30. At the same time the material of the barrier 52 must be such that it itself is not affected by said gases to cause this material to rupture under load.

A shield construction or layer 54 may be provided around the outer periphery of the rocket engine for keeping said outer periphery relatively cool so that any surrounding structure will be unaffected by heat radiated radially outwardly from said rocket engine 10. The substantially annular shield member 54 may be composed of any suitable insulating material which will prevent radiation of heat in a radially outward direction relative to the rocket engine axis or in other words, radially outwardly from the first layer or wedge construction 26. Instead of or in addition to an outer insulating member 54 or in combination therewith a sleeve or plurality of sleeves 56 (only one being shown in FIG. 1) may be provided in surrounding engagement on the radially outward side of the first layer as illustrated in FIGS. 1–3. The sleeves 56 are composed of pyrolytic graphite formed by deposition on a cylindrical surface with the pyrolytic graphite being oriented so that in a radial direction relative to the rocket engine axis the sleeve 56 is relatively highly thermally non-conductive. Thus, the sleeve 56 serves as a radial insulating member for preventing heat from radiating radially outwardly from the first layer. The sleeve 56 is relatively highly thermally conductive in the circumferential and axial directions relative to the rocket engine axis so that the sleeve 56 will aid in conducting heat axially for preventing a heat build-up in the first layer. Thus, the sleeve 56 aids in improving the heat conducting characteristics of the first layer. However, it should be understood that the provision of the sleeve or sleeves 56 is optional and that the sleeve 56 may be eliminated or alternatively the shields 54 may be eliminated and the sleeves 56 used. Also, it is within the scope of the invention to use a combination of sleeves 56 and shield members 54. It is preferable that the sleeves 56 should not be continuous cylinders, but parted in three or more sections, as shown in FIGS. 2 and 3.

During operation or firing of the rocket engine 10 a substantial amount of heat is generated by combustion in the combustion zone 12, which heat acts on the entire inner surface 24 of said rocket engine during passage from said combustion chamber 12 for discharge at the aft end of the rocket engine toward the exit of the exhaust portion 14. As explained above, heat conduction is relatively high in the axial and radial directions in the first or inner layer 26 which as illustrated in the drawings occupies a substantial portion of the entire diameter or radial depth of the rocket engine 10. Because of the thickness of the first layer 26 and the heat conduction characteristics thereof, the first layer forms an excellent heat sink for conducting heat away from the inner surface 24 and thereby reducing the possibility of erosion of said inner surface 24. Because of the annular member or ring of pyrolytic graphite 50 at the upstream end of the first layer and the insulating means surrounding the outer periphery of the rocket engine, either through the layer 56 or shield 54, heat flow at the axial upstream region of the first layer 26 and in the radially outward portions thereof is limited while at the discharge end of the rocket engine heat flow is substantially unlimited. As stated previously, the engine is preferably used in a supporting vehicle and under normal circumstances the discharge end of the rocket engine is exposed to cooler outside temperatures. Thus, the discharge end is normally relatively cooler which permits the heat which is conducted axially through the first layer to radiate outwardly from the discharge end of the rocket engine. This is particularly significant during cool-down periods between firing of the rocket engine since the heat is intentionally limited from conduction radially outwardly and axially upstream of the first layer and the heat therefore will be conducted axially towards the discharge end of the rocket engine for radiation out of said engine.

Figure 6:
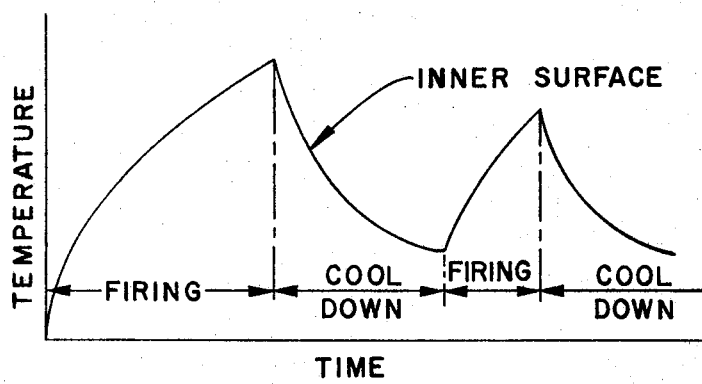
FIG. 6 is a time versus temperature curve illustrating a typical firing sequence of the restartable rocket engine of the invention.

Referring to FIG. 6, there is shown therein a typical time-temperature curve for firing and cool-down periods of the rocket engine. The curve represents the rate of heating up and cooling down of the inner surface 24 of the rocket engine and as can be clearly seen in said FIG. 6 the inner surface substantially immediately begins to cool-down as soon as firing ceases. It will also be seen that the cooling down of the inner surface is relatively rapid, as shown by the slope of the curve, so that the temperature thereof is rapidly reduced and the inner surface does not reach temperatures wherein erosion thereof will commence.

It has also been found that, if the radial depth of the wedges is increased in proportion to the area of the throat region 28 so that at the exit area or discharge end, the nozzle portion 14 will have a greater area of pyrolytic graphite, the heat conduction will be toward the discharge end and radiating back toward the exhaust gases. By this means, steady-state conditons can be reached wherein the temperature of the first or inner layer will reach a point wherein the heat is being returned by radiation to the exhaust gases downstream of the throat region 28 of the nozzle portion 14 substantially as fast as it is being absorbed in the throat region 28. By varying the ratio of area of pyrolytic graphite wedges 26 at the exit or discharge end to the area of the nozzle throat region 28, the radiation of heat can be varied from a substantially axial flow from the discharge end into the outer environment to a flow back toward the exhaust gases for discharge with said gases into the outer environment.

FIGS. 7–10 show another embodiment of the invention. The basic engine 10' of FIGS. 7–10 is substantially the same as that illustrated in FIGS. 1–6 and comprises a first layer composed of stacked pyrolytic graphite wedges 26', a second layer of pyrolytic graphite sleeves 56' (three sleeves illustrated), a diffusion barrier 52', an expansion structure 30' which will be described in greater detail below, and an outer heat shield or casing 54'. At the front or upstream end of the engine 10', there is provided a swirl cup injector mechanism 16' (FIG. 7). The swirl cup injector mechanism 16' is operably connected to a suitable valve mechanism 58' which valve mechanism 58' regulates the flow of fuel and oxidizer to the swirl cup injector. The valve mechanism 58' supplies fuel and oxidizer respectively to separate passageways 60' in the swirl cup injector housing 62' which pasasgeways 60' are operably connected with injector orifices 64'. The fuel and oxidizer, which are preferably of the hypergolic type, do not mix until they are injected into the swirl cup 66' of the swirl cup mechanism 16' wherein the fuel and oxidizer ignite as they mix together.

Referring to FIG. 8, it can be seen that the injector orifices 64' are arranged so that the propellants will be injected substantially tangentially to the inner surface 68' of the swirl cup 66'. By this means the propellants will swirl around the inner surface 68' of the swirl cup 66' wherein the centrifugal force on the injected propellants will cause the propellants to coat said inner surface with a thin liquid film. Thus, as the propellants are injected and mix for combustion as they enter the combustion chamber area 12', the inner surface 68' of the swirl cup will be continually coated with a film of liquid propellant which film will serve to cool the inner surface 68' by removing the heat from combustion therefrom and will effectively keep the walls of the swirl cup from becoming overheated. Because of this feature of the swirl cup injector 16', the propellants are not subject to boiling which can be caused by heat storage in the injector mechanism. Further, because of the remote location of the injector orifices 64' relative to the combustion chamber 12', during periods following shut-down, heat will be transmitted from the injector orifice area to the swirl cup area by conduction and radiation so that the injector orifice end of the injector mechanism will be kept relatively cool and there will be little heat storage in this area which might adversely affect mixture and ignition of the propellants. Also, the tangential injection of the propellants into the swirl cup 66' insures good distribution and mixing of the propellants for pre-combustion in the swirl cup and efficient overall combustion of the propellants.

Figure 9:
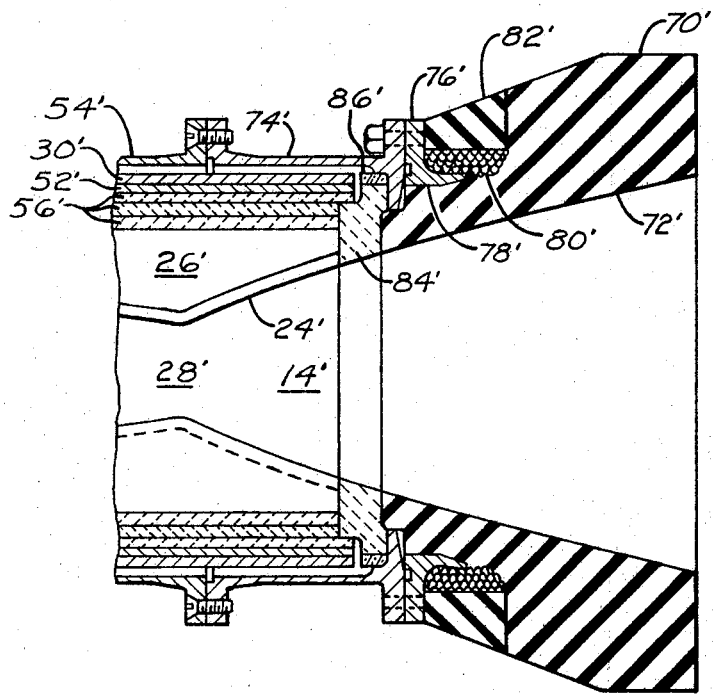
FIG. 9 is a partial sectional view of another embodiment of the invention.

Referring to FIG. 9 specifically, the aft section of the rocket engine 10' is shown therein and includes an exhaust nozzle extension 70'. Exhaust nozzle extensions, such as that illustrated, are used when, for example, the rocket engine is used as an accessory engine for attitude control or the like. In this case, the hot exhaust gases, which are ejected into the outer atmosphere, should be kept as far away from the supporting vehicle as possible so that the supporting vehicle or mechanisms carried by the vehicle do not become overheated from the ejected hot gases. The nozzle extensions may also be used to direct the exhaust gases in a desired manner for steering or attitude control of the vehicle. The exhaust nozzle extension 70' is composed of a plastic composition having relatively high temperature properties, such as, for example, a silica phenolic resin base composition. As seen in FIG. 9, the inner surface 72' is substantially a continuation of the divergent portion of the inner surface 24' of the engine 10'. The extension 70' is attached to an exit cone mount ring 74' by suitable bolts or the like and the exit cone mount ring is in turn suitably attached to the outer housing or heat shield structure 54'. In order to attach the plastic exhaust nozzle extension 70' to the exit cone mount ring 74', a mount ring 76' having a flange portion 78' extending over the outer surface of the extension 70' is fastened to the extension 70' by a wire or plastic wrap structure 80', as illustrated. A ring member 82' of plastic material similar to that of the extension 70' is then placed over the wrap structure 80' so that the ring 76' is held tightly in place. The whole exhaust nozzle extension assembly can then be attached to the exit cone mount ring 74'. In order to prevent the upstream portion of the extension 70' from becoming overheated from the heat conducted axially at the downstream end of the wedges 26' an insulating ring of pyrolytic graphite 84' is disposed between the wedges 26' and the extension 70' with the ring 84' having its plane of deposit oriented so that the ring 84' is highly non-conductive in the axial direction. A washer 86' of a high temperature material such as foamed zirconium is disposed between the ring 84' and the inner surface of the exit cone mount ring 74' to insulate the mount ring 74' from heat conducted radially by the pyrolytic graphite ring 84'. A similar washer 84' may also be used in surrounding engagement with the pyrolytic graphite ring 50' at the upstream end of the engine 10'.

It can be seen in FIG. 9 that the exhaust nozzle portion 14' is somewhat shorter from the throat portion 28' to the exit as compared to the embodiment shown in FIG. 1. In the embodiment of FIG. 9, this portion is cut back slightly to accommodate the nozzle extension 70' and the ring 84. However, the heat radiation characteristics of the engine are substantially unaffected by this modification at the downstream end of the engine. A substantial portion of the inner surface 24' is still available for radiating heat therefrom and extends in a radially direction to a substantial depth of the first layer. It will be further seen that this surface area 24' covers a substantial depth of the first layer so that heat from the hottest regions, or the throat region 28' will be conducted toward the surface area 24' for radiation therefrom. Since the downstream end of the nozzle portion 14' does not become as heated up as the regions including the throat 28', this region may be replaced by a less expensive and not as effective heat conducting material such as a high temperature plastic forming a nozzle extension of the type shown at 70'. Thus, it will be seen that the high temperature operating capabilities permitting frequent restarting of the engine are not substantially affected by the addition of the nozzle extension 70' in the embodiment of FIG. 9.

FIG. 10 shows another embodiment of a metallic expansible member which is similar to the metallic expansible member 30 shown in FIG. 4. The expansible member 30' is composed of a series of relatively thin herringbone-like beams which are inclined relative to the axis of the member 30'. The cutouts 32' are disposed at an incline so as to make the material of the member 30' discontinuous in the circumferential direction to thereby permit restrained expansion in said circumferential direction. Edge notches 85 are formed in the expansible member 30' so that it will expand more easily at the edges thereof in response to the circumferential expansion of the segments 26'. As shown in FIG. 10, the edge notches 85 are placed so as to further define the herringbone-beams at the edge of the member 30'. The functional features of the member 30' are substantially the same as the member 30 and reference may be made to the description relative thereto.

FIG. 12 shows another embodiment of an expansible member (similar to the member 30 of FIG. 4 and 30' of FIG. 10) in combination with a portion of a rocket engine 10". The rocket engine 10" comprises a first layer composed of stacked pyrolytic graphite wedges 26", pyrolytic sleeves 56 (three are shown), a diffusion barrier 52", and an expansion structure 30". A swirl cup or other injecting means is omitted from FIG. 12. However, any suitable injecting means can be provided. The expansible member 30" is composed of a plurality of axially extending metallic rods or strips 90" and circumferentially spaced wire hoops 92". The rods 90" lie parallel to the engine axis and are spaced at regular intervals about the circumference of the engine 10" in contact with the diffusion layer 52". The wire hoops 92" are wound in a zig-zag fashion forming a herringbone-like patern. It is considered within this invention to use a single wire wound about the engine 10" to form the herringbone-like beams.

The wires 92" are held in place on the strips 90" by means of welding or, as shown in FIG. 12, raised flanges 94" affixed to each of the bars 90". The herringbone-like pattern of the wire hoops 92" acts to permit the wedges 26" to expand circumferentially while holding the inner layer resiliently in place.

Figure 13:
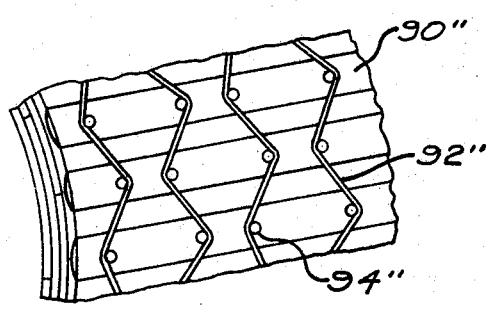
FIG. 13 is a fragmentary view of a slight modification of the embodiment of FIG. 12.

In order to prevent the tensions on the wire hoops 92" from moving the bars 90" out of alignment as the wires respond to the circumferential expansion of the wedges 26", it is within the scope of this invention to provide a herringbone-like pattern of hoops 92", as shown in FIG. 13, having a reverse zigzag or herringbone-like wiring pattern to counter the pulling effect of the wires 92" upon the bars 90". The functional features of this member 30" are substantially the same as the members 30 and 30' and reference may be made to the description relative thereto. The wire wound arrangement of FIGS. 12 and 13 results in a saving in weight over the embodiments of FIGS. 4 and 10 without a decrease in the support or resiliency offered by the entire annular member 30".

In the above detailed description of the invention a novel restartable rocket engine has been described which is capable of numerous restarts. Although the invention has been described in connection with a rocket engine, it will be obvious however, that a structure of the invention has application for other purposes such as a heat shield for other parts of aircraft or in other applications where extreme temperatures are encountered. For example, the invention includes within its scope a restartable rocket engine wherein only the exhaust nozzle portion is constructed in the manner of the invention.

While the invention has been described in detail in its present preferred embodiment it will be obvious to those skilled in the art, after understanding the invention, that various changes and modifications may be made therein without departing from the spirit and scope thereof. For example, instead of being used with a liquid fuel system, the rocket engine of the invention also has application with solid fuels and also may be provided with ignition means for igniting fuels which may be of a type other than the hypergolic fuels described above. It will also be apparent that the inner surface of the construction shown may also be provided with a coating or layer of a refractory material for providing further protection for said inner surface. Also, as previously stated, the construction of the invention has application in complete rocket engines or in portions thereof. The invention is intended also to encompass other types of expadable means surrounding the first layer or wedge structure such as a wire wrap expandable structure for permitting restrained expansion of the wedges in the circumferential direction.

What is claimed is:
1. A multilayer casing structure surrounding an axis, forming a combustion chamber and an exhaust nozzle of a rocket engine, the multilayer structure comprising:
   (a) a radially innermost layer
      (i) extending axially from the upstream end of the combustion chamber, through the nozzle throat region, and substantially to the nozzle discharge end,
      (ii) comprising a plurality of individual segments circumferentially disposed in a side-by-side relation to form an annulus,
      (iii) defining with the surface thereof, the combustion chamber and the nozzle,
      (iv) composed of an anisotropic material, the material oriented so that the inner layer is relatively highly thermally conductive in directions both radial and parallel to the axis, and
      (v) at the downstream end thereof, substantially radially free of insulation to a substantial portion of the radial depth of the nozzle throat region to cause heat to flow, at least during periods between combustion in the rocket engine, substantially axially toward the nozzle discharge end to radiate therefrom, and
   (b) annular means
      (i) surrounding the segments
      (ii) comprising a plurality of herringbone-like beams, and
      (iii) being elastically expansible in at least a circumferential direction relative to the axis to permit, without producing excessive stresses, the thermal expansion of the segments.

2. A multilayer structure as recited in claim 1 wherein the annular means is a metallic member substantially cylindrical in shape and having a plurality of apertures.

3. A multilayer structure as recited in claim 2 further comprising diffusion barrier means including an intermediate layer disposed between the inner layer and the metallic member, the diffusion barrier means preventing contamination of the metallic member by heat and gases produced in the combustion chamber and the intermediate layer composed of material that blocks the passage of the gases and carbon from the inner layer to the metallic member.

4. A multilayer structure as received in claim 2 wherein:
   the apertures
      are predetermined cutout portions,
      disposed at an incline relative to the axis, and
      define the herringbone-like beams; and
   at least one end of the metallic member having edge notches to permit the metallic member to expand more easily in response to the circumferential expansion of the segments.

5. A multilayer structure as recited in claim 2, further comprising insulation means disposed at the upstream end for preventing heat conduction axially upstream of the inner layer.

6. A multilayer structure as recited in claim 2, wherein each one of the segments has
   (a) a wedge-shaped configuration,
   (b) an undercut portion over a substantial portion of one face to allow circumferential expansion of the segment relative to an adjacent one of the segments, and
   (c) a land on the one face adjacent to the inner layer surface for abutting the adjacent segment to cause the inner layer surface to form a gas-tight surface.

7. A multilayer structure as recited in claim 6 wherein the inner layer and the insulation means are composed of pyrolytic graphite, the pyrolytic graphite of the insulation means being oriented so that the insulation means is relatively highly thermally non-conductive in a direction parallel to the axis.

8. An exhaust gas nozzle having a multilayer structure in a rocket engine, the multi-layer nozzle comprising:
(a) a substantially annular housing;
(b) a radially innermost layer
   (i) having a profile defining a convergent-divergent shape,
   (ii) composed of an anisotropic material, the material being oriented so that the inner layer is, relative to the axis, relatively highly thermally conductive in the parallel and radial directions and relatively highly thermally non-conductive in the circumferential direction, and
   (iii) comprising a plurality of segments stacked side by side to form an annulus; and
(c) elastically expansible means
   (i) supporting the segments in the stacked relationship,
   (ii) comprising a plurality of herringbone-like beams, and
   (iii) elastically yieldable in response to the thermal expansion of the segments at least in the circumferential direction so that excessive stresses are prevented from building up in the segments.

9. A nozzle as recited in claim 8 wherein the expansible means is a metallic member substantially cylindrical in shape and having a plurality of apertures.

10. A nozzle as recited in claim 9, wherein each of the apertures has an elongated shape disposed with its principal axis at an incline relative to the longitudinal axis of the nozzle, the apertures defining the herringbone-like beams; and at least one end of the metallic member has edge notches to permit the metallic member to expand circumferentially more easily in response to the thermal expansion of the segments.

11. A nozzle as recited in claim 9, wherein means for insulating is disposed at the upstream end of the inner layer for preventing heat conduction axially upstream, the segments and the insulating means being composed of pyrolytic graphite, and the pyrolytic graphite of the insulation means being oriented so that the insulation means is relatively highly thermally conductive in a direction parallel to the axis.

12. A multilayer casing structure surrounding an axis, forming a combustion chamber and forming a convergent-divergent exhaust nozzle of a rocket engine, the multilayer casing structure comprising:
(a) a first layer
   (i) extending from the upstream end of the combustion chamber substantially to the discharge end of the exhaust nozzle, including the nozzle throat portion,
   (ii) having a profile conforming to the inner surface of the combustion chamber and the nozzle,
   (iii) comprising a plurality of individual segments circumferentially disposed in side-by-side relation to form an annulus, and
   (iv) composed of an anisotropic material, the material being oriented so that the first layer is relatively highly thermally conductive in directions both parallel and radial relative to the axis;
(b) insulating means
   (i) disposed at the upstream and downstream ends of the first layer,
   (ii) coextensive with the first layer in the radial direction,
   (iii) limiting, at least to the radial depth thereof, heat conduction in the axial direction from the first layer, and
   (iv) having at the downstream end a small radial depth relative to the nozzle throat portion to permit substantially unobstructed heat radiation from the nozzle throat portion;
(c) annular means
   (i) surrounding the segments,
   (ii) comprising a plurality of herringbone-like beams,
   (iii) elastically expansible in a circumferential direction relative to the axis, and
   (iv) permitting, without producing excessive stresses, thermal expansion of the segments; and
(d) exhaust nozzle extension means
   (i) having a divergent inner surface conforming to the divergent inner surface of the nozzle and
   (ii) supported at the discharge end of the nozzle, substantially extending the gas flow path of the rocket engine.

13. A multilayer structure as recited in claim 12, wherein the nozzle extension means is composed of a plastic material.

14. A multilayer structure as recited in claim 12, wherein the annular means is a substantially cylindrically-shaped metallic member having a plurality of apertures, the apertures having elongated shapes and having the principal axes thereof disposed at an acute angle to the engine axis, the apertures defining the herringbone-like beams; and the metallic member having edge notches to permit more easily the circumferential expansion thereof in response to the thermal expansion of the segments, the notches and at least some of the apertures defining therebetween a herringbone-like pattern.

15. A multilayer structure as recited in claim 1, wherein the annular means is metallic and comprises:
(a) a plurality of axially-extending members generally parallel with the axis and circumferentially spaced about the structure; and
(b) at least one wire circumferentially wrapped about the axially-extending members in zigzag manner and forming the herringbone-like beams.

16. A multilayer structure as recited in claim 15, wherein each of the axially-extending members is in the form of a bar, and there are a plurality of wires, each of the wires being in the form of a zigzag hoop surrounding the bar members and affixed thereto to form the herringbone-like beams, and the annular means includes means for preventing the bar members from being moved axially out of alignment by the resilient expansion of the wire hoops.

17. A nozzle as recited in claim 8, wherein the expansible means is metallic and comprises:
(a) a plurality of axially-extending members generally parallel with the axis and circumferentially spaced about the structure, and
(b) at least one wire circumferentially wrapped about the axially extending members in zigzag manner and forming the herringbone-like beams.

References Cited

UNITED STATES PATENTS 3,224,193   12/1965   Loprete _____ 239—265.15

FOREIGN PATENTS 897   11/1953   Germany.

OTHER REFERENCES

H. I. Thompson Fiber Glass Co., Astrolite, July 1959. Bulletin No. PB 7–24A.

CARLTON R. CROYLE, Primary Examiner

D. HART, Assistant Examiner

U.S. Cl. X.R.

239—265.15